INVENTORS
HENDRIK VAN DE WEG
ADRIANUS JOHANNES WILHELMUS MARIE VAN OVERBEEK
WILHELMUS ANTONIUS JOSEPH MARIE ZWIJSEN
BY
AGENT

April 2, 1963 H. VAN DE WEG ETAL 3,084,263
CURRENT SWITCHING THROUGH AN INDUCTIVE IMPEDANCE
Filed Oct. 27, 1955 2 Sheets-Sheet 2

INVENTORS
HENDRIK VAN DE WEG
ADRIANUS JOHANNES WILHELMUS MARIE VAN OVERBEEK
WILHELMUS ANTONIUS JOSEPH MARIE ZWIJSEN
BY Fred M. Vogel
AGENT

3,084,263
CURRENT SWITCHING THROUGH AN INDUCTIVE IMPEDANCE

Hendrik van de Weg, Adrianus Johannes Wilhelmus Marie van Overbeek, and Wilhelmus Antonius Joseph Marie Zwijsen, Eindhoven, Netherlands, assignors, by mesne assignments, to North American Philips Company, Inc., New York, N.Y., a corporation of Delaware
Filed Oct. 27, 1955, Ser. No. 543,202
Claims priority, application Germany Nov. 19, 1954
3 Claims. (Cl. 307—88)

This invention relates to circuit arrangements for switching on and off the current through a substantially inductive impedance by means of a junction transistor, the collector emitter circuit of which includes the impedance; the substantially inductive impedance may be included, for example, in a static magnetic trigger circuit.

As is well-known, static magnetic trigger circuits are used inter alia for registering coded intelligence, the intelligence being determined by the condition of remanence of the ferromagnetic core material. By means of current pulses led through at least one input winding coupled to the ferromagnetic circuit, it is possible to adjust the core to a given condition or remanence corresponding to the value "0" or "1" of the coded intelligence; "0" being characterized, for example, by positive remanence and "1" by negative remanence. By measuring the voltage set up across an output winding coupled to the core due to the action of a subsequent current pulse through said input winding, it is possible to determine the condition of remanence. That is, the intelligence obtained in the core may be read out.

The current pulses for switching on and off have a comparatively high value, while the voltage required for producing said current, on account of the comparatively high value of the inductance of static magnetic trigger circuits, has a value such that, if no particular steps are taken, the power to be supplied by the transistor is higher than its maximum permissible power output.

The object of the invention is to provide circuit arrangements having an output which is considerably higher than the maximum permissible output of the transistor. In accordance with the present invention a resistor is connected in series with the impedance and has a resistance value of sufficient magnitude such that, when the current is switched on, the voltage difference between the emitter and the collector is low with respect to the voltage drop across the resistor.

In order that the invention may be readily carried into effect, it will now be described, by way of example, with reference to the accompanying drawing, in which.

Figure 1:
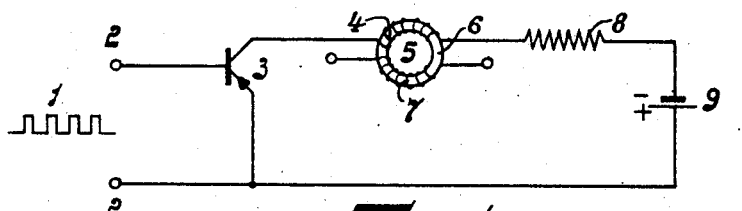
FIG. 1 is a schematic diagram of an embodiment of the circuit arrangement of the present invention.

In FIG. 1, the current pulses 1 are supplied through a lead 2 to the base circuit of a junction transistor 3. The collector circuit of the transistor 3 includes the input winding 4 of a static magnetic trigger circuit 5 in series with a resistor 8 and a source of supply voltage. The magnetic trigger circuit 5 comprises a closed magnetic circuit 6 of ferromagnetic material having a high remanence and a substantially parallelogram-like hysteresis loop and the input winding 4 and an output winding 7, both coupled to the magnetic circuit 6. The windings 4 and 7 may otherwise each comprise only one turn.

Figure 2:
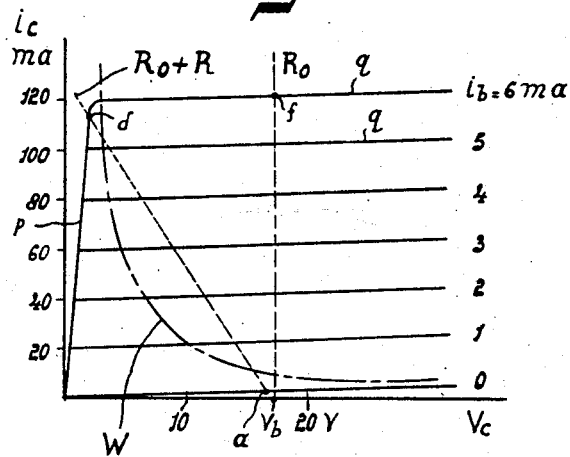
FIG. 2 is a graphical presentation of a series of transistor characteristics.

In FIG. 2, the collector current $i_c$ of a junction transistor is shown as a function of the collector voltage $V_c$ for different values of the base current $i_b$. For high values of the base current $i_b$, the collector current $i_c$ increases to more than 100 milliamperes within several tenths of volts of collector voltage $V_c$. For high values of the collector voltage $V_c$, the collector current $i_c$ is substantially determined by the value of the base current $i_b$. The rapidly rising branch $p$, which represents a differential resistance of only several ohms then changes to the substantially horizontal branch $q$ having a differential resistance of at least several kilohms.

Assuming the voltage of the source of supply voltage 9 to be $V_b$, the resistive impedance of the static magnetic trigger circuit 5 to be $R_0$, and the resistance value of the resistor to be $R$, the dotted line $R_0+R$ constitutes the load line of the transistor, before the current through the input winding 4 is switched on. The resistive impedance $R_0$ is usually negligible with respect to the resistance value $R$.

When no control pulses are supplied to the leads 2, so that the voltage set up at the base and hence the base current $i_b$ is zero, the transistor 3 is operated at workpoint $a$. The collector voltage $V_c$ then substantially corresponds to the supply voltage $V_b$ and the current $i_c$ occurring in the input winding 4 is substantially negligible.

When the control pulses are received, at the occurrence of the leading edges thereof, the voltage set up at the base and hence the base current $i_b$ suddenly increases to a comparatively high value. As a result thereof, the collector current $i_c$ also increases. During the increase of the collector current $i_c$ the input winding 4 of the trigger circuit constitutes a material impedance. The rate of this increase is directly proportional to the voltage $V_b$ of the source of voltage supply 9; the value of voltage $V_b$ thus being determined by the inductance of the input winding and the desired rate of switching.

If the emitter-collector circuit of the transistor did not include a resistor 8 is series with the input winding 4 and the voltage supply source 9, the load on the transistor would be constituted only by $R_0$ after $i_c$ had reached its final value. This load corresponds to the load line which is likewise indicated by $R_0$ in FIG. 2. Since $R_0$, the resistive impedance of the input winding 4, is usually very small, for example 1 ohm or less, this load line is substantially perpendicular to the $V_c$-axis. The corresponding work-point of the transistor is indicated by $f$.

FIG. 2 shows the maximum permissible energy loss of a normal junction transistor in curve W. The transistor is thus highly overloaded at the work-point indicated by $f$.

However, according to the invention, if the resistor 8 in series with the input winding is included in the collector-emitter circuit, the load, after $i_c$ has reached its final value, corresponds to the load line indicated by $R+R_0$ in FIG. 2. The work-point of the transistor is then $d$. The resistance value of the resistor 8 is chosen to be such that at the workpoint $d$ the transistor is operated below its maximum permissible power as indicated by W. The power W is exceeded only during the short transition time in which the work-point of the transistor passes from point $a$ to point $d$. At the workpoint $d$ the transistor may be operated for an arbitrarily long period. The power delivered to the trigger circuit and the resistor substantially corresponds to the product of the supply voltage $V_b$ and the value of the collector current $i_c$ corresponding to the workpoint $d$. This output may considerably exceed the maximum permissible power W dissipated in the transistor. The voltage drop across the transistor is small with respect to the voltage drop across the resistor.

When the base current $i_b$ is switched off and hence during the occurrence of the trailing edges of the current pulse, the collector current $i_c$ also decreases to the final value determined by the workpoint $a$. However, it appears that this decrease is delayed on account of the charge present in the base. This charge is injected from the emitter to the base.

Figure 3:
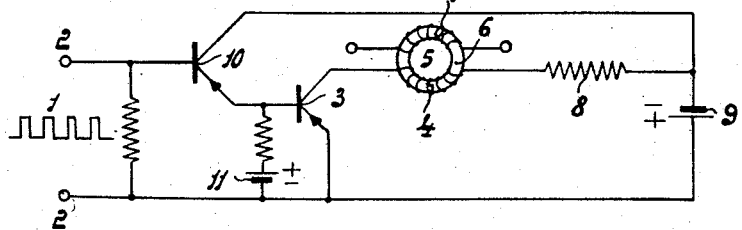
FIG. 3 is a schematic diagram of another embodiment of the circuit arrangement of the invention.

FIG. 3 shows one embodiment of a circuit arrangement according to the invention in which the collector current decrease is accelerated by switching a blocking voltage source 11 into the base circuit of transistor 3. This causes said charge to flow off to the emitter instead of to the collector and hence allows for a very rapid decrease of current in the collector circuit.

In FIG. 3, the transistor 3 is controlled, in addition, by means of a transistor 10 which is used as a preliminary stage. Since the transistor 10 is of a conductivity type similar to that of transistor 3, the base of transistor 3 is connected to the emitter of transistor 10. Both transistors are operated by the same source of supply voltage 9.

Figure 4:
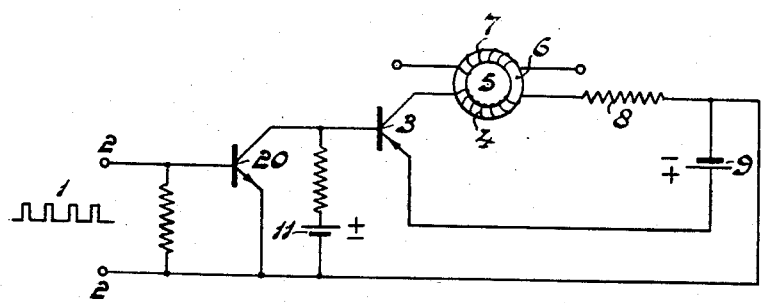
FIG. 4 is a modification of the embodiment of FIG. 3.

However, if the two transistors are of opposite conductivity type, the base of transistor 3 is connected to the collector of transistor 20, which is used as a preliminary stage. A circuit in which the transistors are of opposite conductivity types is shown in FIG. 4. In this case also both transistors are operated by the same source of supply voltage 9.

In the embodiments shown, the magnetic field produced in the core 6 of the trigger circuit 5 by the current flowing through the input winding 4 has only one direction. It will be evident that for obtaining a magnetic field in the opposite direction another input winding may be provided on the core, which is likewise included, in series with a resistor, in the emitter-collector circuit of another transistor.

Figure 5:
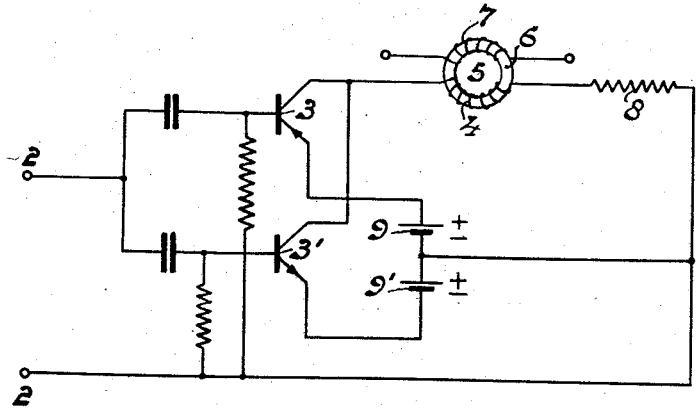
FIG. 5 is a schematic diagram of another embodiment of the circuit arrangement of the present invention.

However, it is alternatively possible to utilize only one input winding coupled to the core in series with a resistor for both directions of the magnetic field. In FIG. 5, the input winding 4, in series with a resistor 8, is included in both the collector-emitter circuit of transistor 3 and the collector-emitter circuit of transistor 3'. The two transistors are of opposite conductivity types. The collector-emitter circuit of transistor 3 includes the source of voltage supply 9 and the collector-emitter circuit of transistor 3' includes the source of voltage supply 9'. Under the action of positive control pulses supplied to the lead 2, the transistor 3 produces currents of one direction in the input winding, and under the action of negative control pulses supplied to the lead 2, the transistor 3' produces currents of the other direction in the input winding. Said currents of opposite direction thus produce magnetic fields of opposite direction in the core 6.

The device according to the invention is thus highly suitable for controlling static magnetic trigger circuits connected to form a memory matrix in which the trigger circuits are arranged in rows and columns. Each trigger circuit may, for example, have two input windings for each direction of the magnetic field produced in the core, one input winding being connected in series with the input windings of the associated row and the other input winding being connected in series with the input windings of the associated column. Consequently, each row of each column of input windings may be provided with only one resistor in the collector-emitter circuit of the associated transistor. In this case each trigger circuit thus comprises four input windings. By utilizing a single winding for both directions of the magnetic field, as in the circuit of FIG. 5, it is possible to reduce this number to two.

What is claimed is:

1. A switching circuit arrangement for a magnetic memory core, comprising a closed core composed of ferromagnetic material having a substantially rectangular hysteresis loop, an input winding coupled to said core, an output winding coupled to said core, a junction type transistor having an emitter electrode, a collector electrode, and a base electrode forming an input electrode system with said emitter electrode, means for supplying a switching pulse to said base electrode for switching over said core from one remanent condition to another, a source of voltage supply, and a resistor connected in the collector circuit of the transistor in series circuit arrangement with said input winding and said voltage source between said collector and emitter electrodes, said resistor having a resistance value of sufficient magnitude such that the potential difference between said emitter and collector electrodes is small relative to the voltage drop across said resistor when a pulse is supplied to said input electrode system and the power delivered to said core and said resistor substantially exceeds the maximum permissible power dissipated in said transistor.

2. A switching circuit arrangement for a magnetic memory core, comprising a closed core composed of ferromagnetic material having a substantially rectangular hysteresis loop, an input winding coupled to said core, an output winding coupled to said core, a pair of junction type transistors each having an emitter electrode, a collector electrode, and a base electrode forming an input electrode system with said emitter electrode, a source of voltage supply, means for supplying a switching pulse to the input electrode systems of said transistors for switching over said core from one remanent condition to another, a resistor connected in series circuit arrangement with said input winding and said voltage source, and means coupling said series circuit arrangement between the collector and emitter electrodes of said transistors, said resistor having a resistance value of sufficient magnitude such that the potential difference between the emitter and collector electrodes of at least one of said transistors is small relative to the voltage drop across said resistor when a pulse is supplied to said input electrode systems and the power delivered to said inductive impedance and said resistor substantially exceeds the maximum permissible power dissipated in said transistor.

3. A switching circuit arrangement for a magnetic memory core, comprising a closed core composed of ferromagnetic material having a substantially rectangular hysteresis loop, an input winding coupled to said core, an output winding coupled to said core, a pair of junction type transistors of opposite conductivity type each having an emitter electrode, a base electrode and a collector electrode, a source of voltage supply, means coupling the emitter electrodes of said transistors through said voltage supply source, means coupling said base electrodes, means connecting said collector electrodes, means for supplying a switching pulse to said base coupling means for switching over said core from one remanent condition to another, a resistor connected in series circuit arrangement with said input winding, and means coupling said series circuit arrangement between said collector connecting means and said voltage supply source, said resistor having a resistance value of sufficient magnitude such that the potential difference between the emitter and collector electrodes of each of said transistors is small relative to the voltage drop across said resistor when a switching pulse is supplied to said base coupling means and the power delivered to said inductive impedance and said resistor substantially exceeds the maximum permissible power dissipated in said transistors.

References Cited in the file of this patent

UNITED STATES PATENTS

| | | |
|---|---|---|
| 2,368,780 | Roberts | Feb. 6, 1945 |
| 2,692,337 | Hanson | Oct. 19, 1954 |
| 2,710,928 | Whitney | June 14, 1955 |
| 2,774,888 | Trousdale | Dec. 18, 1956 |
| 2,791,644 | Sziklai | May 7, 1957 |
| 2,824,697 | Pittman et al. | Feb. 25, 1958 |
| 2,838,675 | Wanlass | June 10, 1958 |
| 2,845,529 | Weldon | July 29, 1958 |
| 2,920,214 | Moore | Jan. 5, 1960 |